United States Patent
Wilke et al.

(10) Patent No.: US 8,308,608 B2
(45) Date of Patent: Nov. 13, 2012

(54) HYDRAULIC CLUTCH FILL CONTROL SYSTEMS FOR A TRANSMISSION OF A VEHICLE

(75) Inventors: Nathaniel E. Wilke, Waterford, MI (US); Todd R. Berger, Pinckney, MI (US); Joel H. Gunderson, Canton, MI (US)

(73) Assignee: GM Global Technology Operations LLC

( * ) Notice: Subject to any disclaimer, the term of this patent is extended or adjusted under 35 U.S.C. 154(b) by 420 days.

(21) Appl. No.: 12/691,943

(22) Filed: Jan. 22, 2010

(65) Prior Publication Data

US 2011/0183811 A1 Jul. 28, 2011

(51) Int. Cl.
- *B60W 10/00* (2006.01)
- *F16D 25/12* (2006.01)
- *G06F 7/00* (2006.01)

(52) U.S. Cl. ............ 477/76; 192/85.63; 701/66
(58) Field of Classification Search .......... 477/76, 477/98, 80, 86; 192/109 F, 85.63, 82 T; 701/66
See application file for complete search history.

(56) References Cited

U.S. PATENT DOCUMENTS

| | | | |
|---|---|---|---|
| 4,707,789 A | | 11/1987 | Downs |
| 5,307,727 A | * | 5/1994 | Berger et al. ............ 91/29 |
| 5,518,468 A | * | 5/1996 | Sametz et al. ............ 477/156 |
| 6,292,732 B1 | | 9/2001 | Steinmetz et al. |
| 6,915,890 B1 | | 7/2005 | Whitton et al. |
| 7,051,856 B2 | | 5/2006 | Hessel et al. |
| 7,314,128 B2 | * | 1/2008 | Gunderson et al. ...... 192/85.41 |
| 2003/0121748 A1 | * | 7/2003 | Harvey et al. ............ 192/85 R |
| 2009/0036265 A1 | * | 2/2009 | Hwang et al. ............ 477/76 |
| 2012/0067690 A1 | * | 3/2012 | Postic et al. ............ 192/85.63 |
| 2012/0152688 A1 | * | 6/2012 | Lee et al. ................ 192/85.63 |

* cited by examiner

*Primary Examiner* — Roger Pang

(57) ABSTRACT

A method of filling a clutch chamber of an automatic transmission includes determining an engage pressure to engage a clutch of the automatic transmission. The method determines a reactive pressure of a return spring of the clutch. The method also estimates a fill pressure based on the engage pressure and the reactive pressure. The method estimates a flow rate based on the engage pressure, and generates a fill pressure command signal to fill the clutch chamber based on the fill pressure, the flow rate and a flow rate limit.

20 Claims, 11 Drawing Sheets

HYDRAULIC CLUTCH FILL CONTROL SYSTEMS FOR A TRANSMISSION OF A VEHICLE

FIELD

The present invention relates to transmission control systems and, more particularly, to transmission clutch fill control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An automatic transmission of a vehicle includes multiple clutches to hold gears for selected gear operating ranges. A transmission control module may determine which clutch to disengage (off-going clutch) and which clutch to engage (on-coming clutch) when a change in a gear operation range occurs. A change in a gear operation range may occur according to a shift schedule. Hydraulic pressure is provided to the on-coming clutch to fill a corresponding clutch chamber with transmission fluid and engage a clutch pack. The term "clutch pack" may refer only to friction materials and spacer plates of a clutch assembly. This occurs during a clutch fill mode of transmission clutch control.

During the clutch fill mode, transmission fluid in the clutch chamber is used to push a piston-apply member to engage with the clutch pack. After the piston-apply member is engaged with the clutch pack, hydraulic pressure may further be applied to the on-coming clutch to carry torque during a clutch pressure mode that follows the clutch fill mode. A predetermined hydraulic pressure may be supplied to the clutch chamber during the clutch fill mode.

The clutch fill mode may include supplying the on-coming clutch with hydraulic pressure for a predetermined fill period. The predetermined fill period may be empirically determined. Values, such as clutch volume values, may be stored in a transmission control module and/or memory as part of a look-up table. Predetermined fill periods may be calculated based on flow rate into a clutch under operating conditions. An example of using a predetermined fill period in a clutch fill mode is described in U.S. Pat. No. 4,707,789.

SUMMARY

In one respect, a method of filling a clutch chamber of an automatic transmission is provided. The method includes determining an engage pressure to engage a clutch of the automatic transmission. A reactive pressure of a return spring of the clutch is estimated. A fill pressure for filling the clutch is estimated based on the engage pressure and the reactive pressure. A flow rate is estimated based on the engage pressure. A fill pressure command signal to fill the clutch chamber is generated based on the fill pressure, the flow rate and the flow rate limit.

In other features, a method of filling a clutch chamber of an automatic transmission is provided. The method includes determining a fill pressure for filling the clutch chamber. A volume of the clutch chamber is determined. A flow rate to fill the clutch chamber is also estimated. A flow rate limit is determined based on a line pressure signal of hydraulic pressure of a pressurized transmission fluid supply line, a clutch state signal of a torque converter clutch and a temperature signal of transmission fluid inside the automatic transmission. A fill time to fill the clutch chamber is determined based on the volume, the flow rate and the flow rate limit. The fill pressure is applied for the fill time.

In another embodiment, a system for filling a clutch chamber of an automatic transmission is provided. The system includes a pressure control module that determines an engage pressure to engage a clutch of the automatic transmission. The pressure control module also estimates a reactive pressure of a return spring of the clutch. The pressure control module generates a fill pressure command signal to fill the clutch chamber based on the engage pressure and the reactive pressure. The system includes a clutch volume estimation module that estimates a volume of the clutch chamber. The system includes a fill rate estimation module that estimates a fill rate based on a flow rate and a flow rate limit. The system includes a fill time estimation module that generates a fill time command signal based on the volume and the fill rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
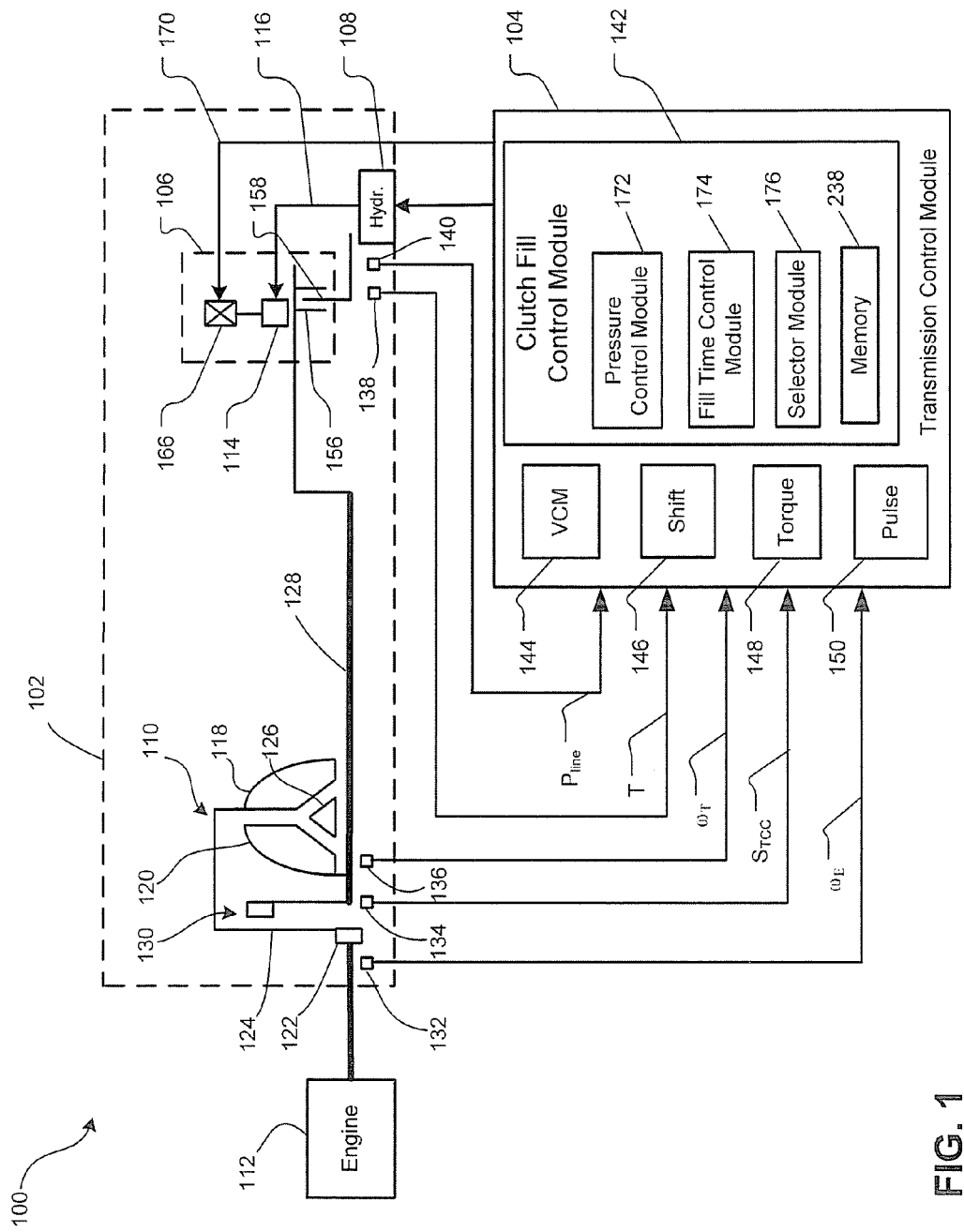
FIG. 1 is a schematic diagram of an exemplary transmission control system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a transmission control system 100 for controlling an automatic transmission 102 is shown. The transmission control system 100 includes the automatic transmission 102 and a transmission control module (TCM) 104. The automatic transmission 102 may include a clutch system 106, a hydraulic supply system 108, and a torque converter 110. An engine 112 may be operatively connected to, and drive the automatic transmission 102. Pressurized transmission fluid may be supplied by the hydraulic supply system 108 to a control valve 114 via a hydraulic line 116.

The torque converter 110 may include a pump 118 and a turbine 120. The pump 118 may be operatively connected to the engine 112 at a hub 122 of the torque converter 110 via a torque converter housing 124. The turbine 120 may be hydraulically driven by the pump 118. The turbine 120 may also be hydraulically coupled with the pump 118 via a stator 126 of the torque converter 110. The turbine 120 may be operatively connected to an input shaft 128 of the transmission. The turbine 120 may drive the transmission input shaft 128 during vehicle operation.

The torque converter 110 may include a torque converter clutch (TCC) 130. The TCC 130 may be connected to the input shaft 128. The TCC 130 may be operated at a LOCKED state or an OPEN state. The TCC 130 may be at the LOCKED state when a hydraulic pressure is applied to the TCC 130. The hydraulic pressure may cause the torque converter 110 to be locked between the pump 118 and the turbine 120 when the TCC 130 is operated in a LOCKED state. The engine 112 drives the pump 118, the turbine 120 and the input shaft 128 as one single unit when the TCC 130 is in the LOCKED state. The TCC 130 may be in an OPEN state when the TCC 130 is not locked.

The transmission control system 100 may include an engine speed sensor 132, a clutch state sensor 134 for the TCC 130, a turbine speed sensor 136, a temperature sensor 138 and a line pressure sensor 140. The engine speed sensor 132 detects an engine speed and generates an engine speed signal $\omega_E$. The clutch state sensor 134 detects a state of the TCC 130 and generates a clutch state signal $S_{TCC}$. The clutch state signal $S_{TCC}$ may indicate that the TCC 130 is in one of a LOCKED state and an OPEN state. The turbine speed sensor 136 detects a turbine speed and generates a turbine speed signal $\omega_T$. The temperature sensor 138 detects a temperature of transmission fluid inside the transmission and generates a temperature signal T. The line pressure sensor 140 detects a hydraulic pressure of pressured transmission fluid inside the transmission and generates a line pressure signal $P_{line}$.

As an alternative the clutch state sensor 134 and the line pressure sensor 140 may not be included in the transmission control system 100. The clutch state signal $S_{TCC}$ and the line pressure signal $P_{line}$ may be calculated and generated based on one or more system models and/or based on a command signal sent to a solenoid (e.g., solenoid 166) that controls line pressure and other inputs of transmission.

The TCM 104 may include a clutch fill control module 142, a valve control module 144, a shift scheduler module 146, a transmission torque module 148, and a clutch pulse module 150. The TCM 104 receives the engine speed signal $\omega_E$, the turbine speed signal $\omega_T$, the temperature signal T. The TCM 104 may command and/or generate the clutch state signal $S_{TCC}$ and the line pressure signal $P_{line}$.

Figure 2A:
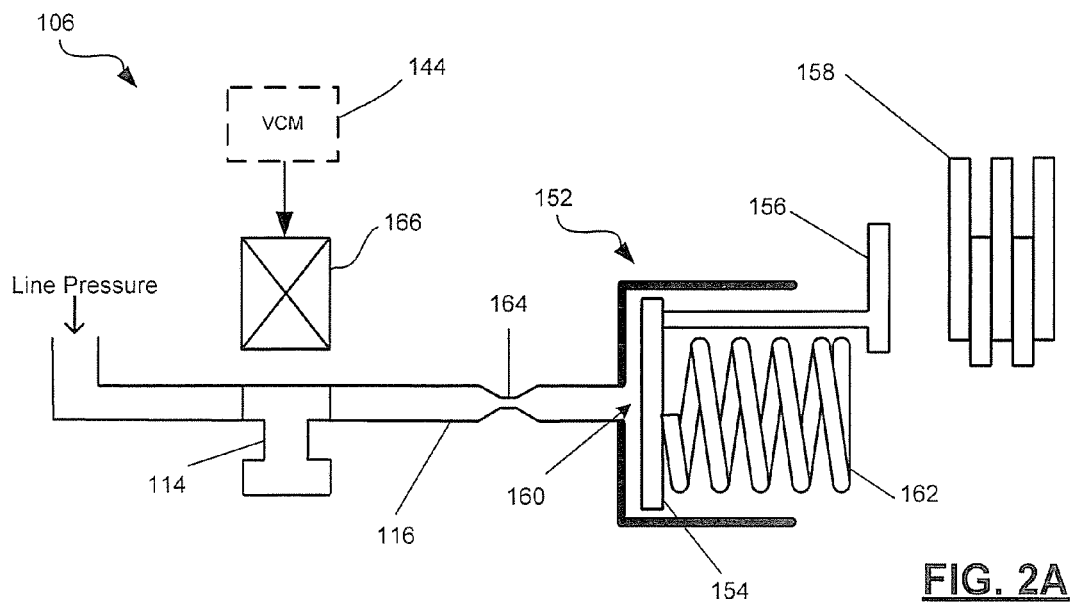
FIG. 2A is a schematic diagram of a clutch system of an automatic transmission in a clutch idle mode before clutch chamber filling.

Referring now also to FIG. 2A, a schematic diagram of the clutch system 106 of FIG. 1 is shown. The clutch system 106 is shown in a clutch idle mode that is before a clutch filling event. The clutch system 106 may include a clutch 152, a piston 154 of the clutch, a piston-apply member 156, a clutch pack 158 and a clutch chamber 160. The clutch system 106 may also include a return spring 162 that generates a reactive pressure. The clutch system 106 also includes the hydraulic line 116, also referred to as transmission fluid supply line. Transmission fluid may be supplied at a "line pressure" to the clutch chamber 160 via the hydraulic line 116. The hydraulic line 116 may include a flow-restricted section referred to as orifice 164.

The control valve 114 may be used to control a hydraulic flow in the hydraulic line 116. The control valve 114 may be operated in an OPEN state to allow a maximum transmission fluid flow through the hydraulic line 116. The control valve 114 may be operated in a CLOSED state to prevent transmission fluid from flowing through the hydraulic line 116. The control valve 114 may be operated in a REGULATION state to allow a hydraulic pressure to be regulated at the orifice 164. The control valve 114 may be actuated by a solenoid 166. The solenoid 166 may operate the control valve 114 in one of the OPEN, CLOSED and REGULATION states. The solenoid 166 may be controlled by the valve control module 144.

During the clutch idle mode, the control valve 114 is in a CLOSED state to isolate the clutch chamber 160 from receiving transmission fluid through the hydraulic line 116. The clutch chamber 160 is in a low pressure state when the control valve 114 is closed in the clutch idle mode. The piston apply member 156 is not engaged to the clutch pack 158, and no pressure or friction is generated within the clutch pack 158 during the clutch idle mode. A clutch may begin to transfer torque when the piston apply member 156 is engaged to the clutch pack 158. The clutch chamber 160 contains a minimum amount of transmission fluid during the clutch idle mode.

Figure 2B:
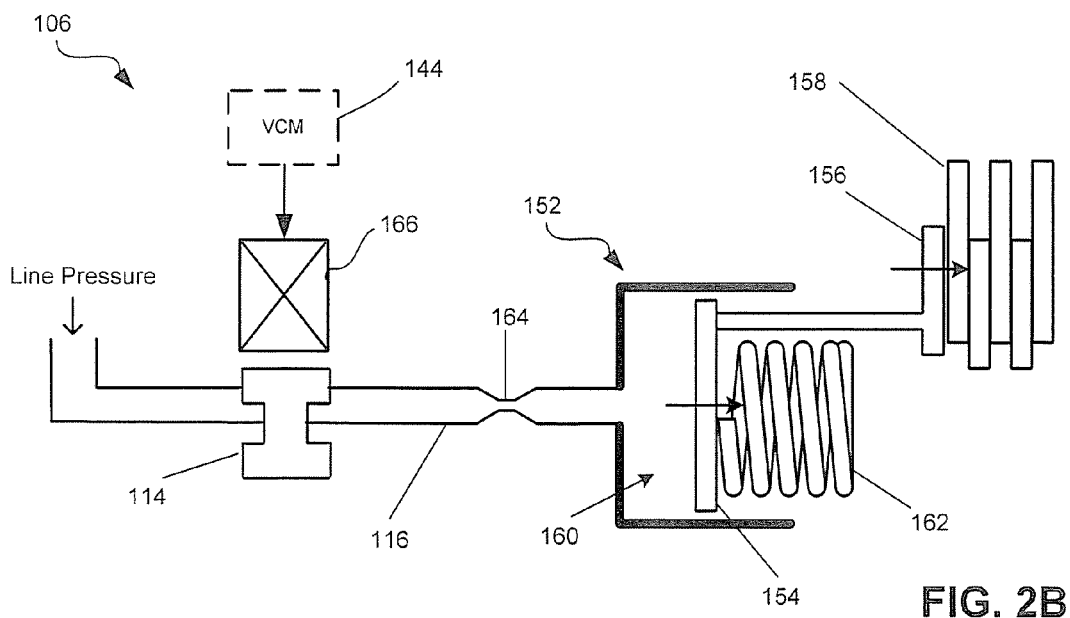
FIG. 2B is a schematic diagram of the clutch system in FIG. 2A in a clutch fill mode.

FIG. 2B shows the clutch system 106 in a clutch fill mode. Clutch control may switch from a clutch idle mode to clutch fill mode to fill the clutch chamber 160. During the clutch fill mode, a clutch fill pressure is determined. A fill pressure command is applied to the solenoid 166. The solenoid 166 may operate the control valve 114 in a REGULATION state to generate the clutch fill pressure according to the pressure fill command. The clutch fill pressure may be generated downstream from the orifice 164 that is downstream from the control valve 114. A fill time command may be determined for filling the clutch chamber 160.

A flow of transmission fluid fills the clutch chamber 160 during the clutch fill mode. The flow stops when the clutch chamber 160 is filled. The clutch fill mode is completed when the clutch chamber 160 is filled. A volume of the transmission fluid filled in the clutch chamber 160 when the clutch fill mode is completed is referred to as clutch volume, also referred to as volume of the clutch chamber. As the clutch chamber 160 is filled, the transmission fluid pushes the piston-apply member 156 toward the clutch pack 158 during the clutch fill mode. The piston-apply member 156 makes contact with the clutch pack 158 and engages the clutch pack 158 with a determined engage pressure when the clutch fill mode is completed.

In order for the piston-apply member 156 to engage the clutch pack 158 with the determined engage pressure, the clutch-fill pressure may need to overcome a reactive pressure exerted upon the piston 154. The reactive pressure may be generated by the return spring 162 of the clutch. The reactive pressure may be estimated. An estimation of the reactive pressure may be used for controlling the clutch filling event.

Figure 3:
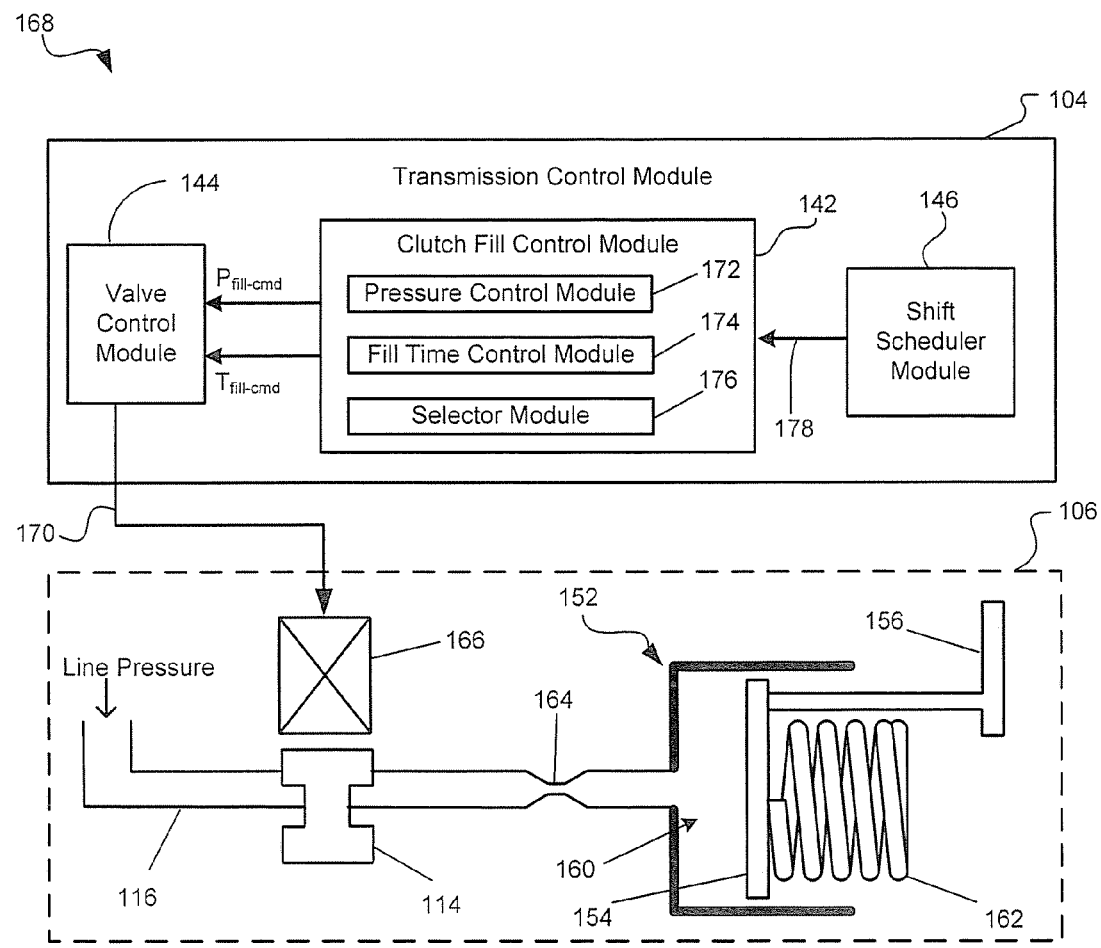
FIG. 3 shows an exemplary clutch fill control system according to the principles of the present disclosure.

FIG. 3 shows a schematic diagram of a clutch control system 168 for operating the clutch system 106. The clutch control system 168 may include the TCM 104 and the clutch system 106. The TCM 104 generates a valve control signal 170 to operate the clutch system 106. The TCM 104 may include the valve control module 144, the clutch fill control module 142 and the shift scheduler module 146. The valve control module 144 may generate the valve control signal 170 to operate the solenoid 166 based on a fill pressure command signal $P_{fill-cmd}$ and a fill time command signal $T_{fill-cmd}$.

The clutch fill control module 142 may include a pressure control module 172, a fill time control module 174 and a selector module 176. The pressure control module 172 may generate the fill pressure command signal $P_{fill-cmd}$. The fill time control module 174 may generate the fill time command signal $T_{fill-cmd}$. The selector module 176 may determine a set of control parameters for the pressure control module 172 and the fill time control module 174 to perform control computations. The selector module 176 may determine the control parameters based on a shift schedule signal 178.

The shift scheduler module 146 may determine transmission gear ranges for vehicle operation. The gear ranges may be determined, for example, based on vehicle speed and engine throttle position. The shift schedule signal 178 may indicate an on-coming clutch that is to be engaged. The shift schedule signal 178 may also indicate an off-going clutch that is to be disengaged.

Figure 4:
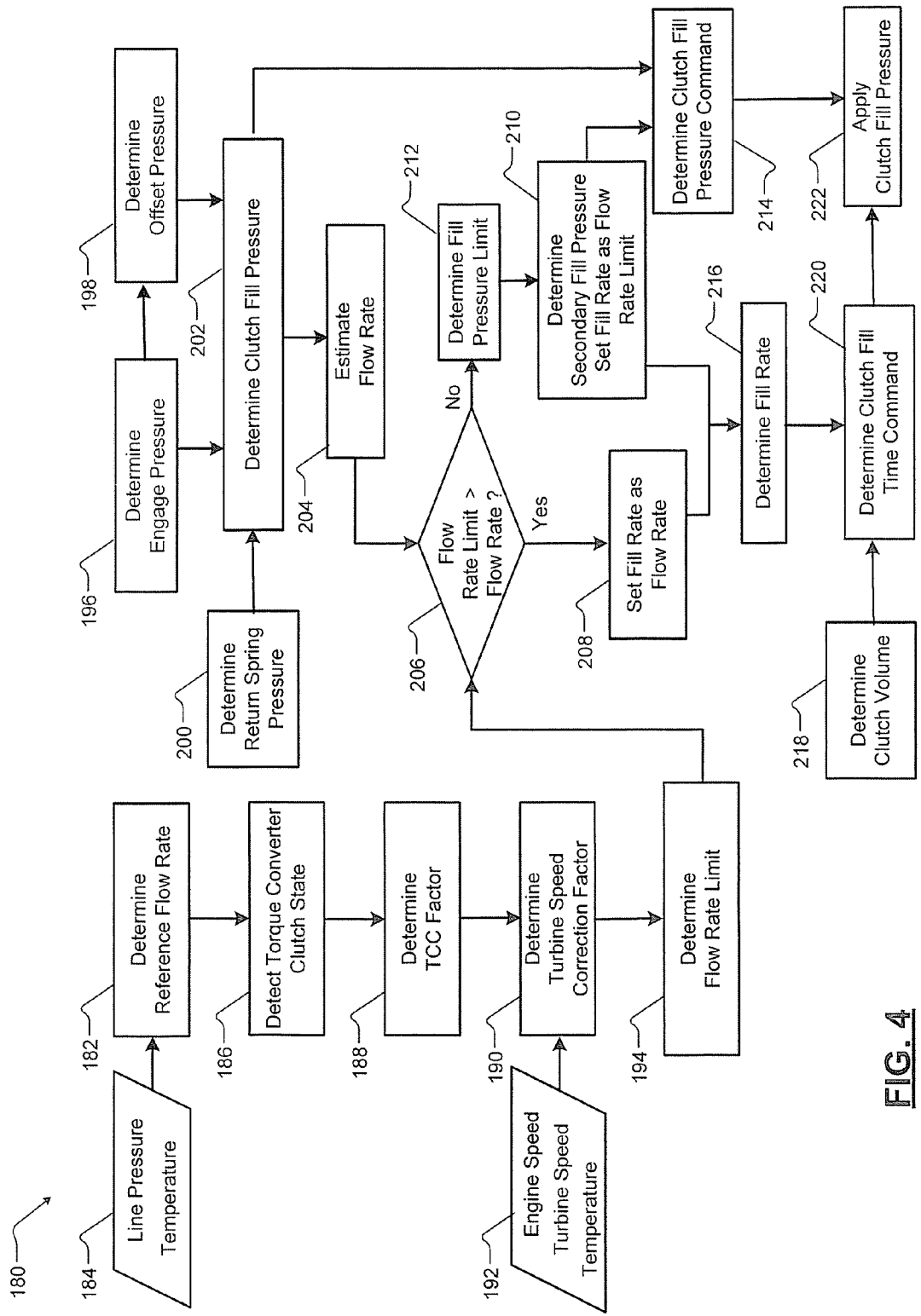
FIG. 4 illustrates a method of filling a clutch according to the principles of the present disclosure.

Referring now also to FIG. 4, an exemplary method 180 of filling the clutch 152 is illustrated. Control of the clutch fill control module 142 may execute associated steps of the method 180. The method 180 may include starting a first process at step 182.

In step 182, the clutch fill control module 142 determines a reference flow rate based on a line pressure and a temperature of transmission fluid. Values of the line pressure and the temperature may be determined in step 184.

In step 186, the clutch fill control module 142 detects a torque converter state. In step 188, the clutch fill control module 142 determines a TCC factor of hydraulic flow based on the torque converter state detected in step 186.

In step 190, the clutch fill control module 142 determines a turbine speed correction factor of hydraulic flow based on an engine speed, a turbine speed and a temperature of transmission fluid. Values of the engine speed, the turbine speed and the temperature may be determined in step 192.

In step 194, the clutch fill control module 142 computes a flow rate limit based on the reference flow rate, the TCC factor, and the turbine speed correction factor.

The method 180 may include starting a second process at step 196 to estimate an engage pressure. In step 198, the clutch fill control module 142 estimates an offset pressure based on the engage pressure.

The method 180 may include starting a third process at step 200 to determine a reactive pressure of a return spring. In step 202, the clutch fill control module 142 estimates a clutch fill pressure based on the engage pressure, the reactive pressure, and the offset pressure.

In step 204, the clutch fill control module 142 estimates a flow rate for filling the clutch chamber 160. In step 206, the clutch fill control module 142 determines whether the flow rate limit determined in step 194 is greater than the flow rate estimated in step 204. Control proceeds to step 208 when the flow rate limit is greater than the flow rate. Otherwise control proceeds to step 210. In step 208, the clutch fill control module 142 sets a clutch fill rate equal to the flow rate estimated in step 204.

In step 212, the clutch fill control module 142 determines a pressure limit for filling the clutch chamber 160. In step 210, the clutch fill control module 142 determines a secondary fill pressure when the flow rate limit is less than the flow rate. The secondary fill pressure is set equal to the pressure limit when the flow rate limit is less than the flow rate. The clutch fill control module 142 also determines a clutch fill rate. The clutch fill rate is set equal to the flow rate limit.

In step 214, the clutch fill control module 142 determines a fill pressure command based on the clutch fill pressure determined in step 202 and the secondary fill pressure determined in step 210. The fill pressure command is set equal to the clutch fill pressure when the flow rate limit is greater than the flow rate. The fill pressure command is set equal to the secondary fill pressure when the flow rate limit is less than the flow rate.

In step 216, the clutch fill control module 142 determines a clutch fill rate. The clutch fill rate is selected from one of the flow rate determined in step 208 and the flow rate limit determined in step 210. The clutch fill rate is set equal to the flow rate when the flow rate limit is greater than the flow rate. The clutch fill rate is set equal to the flow rate limit when the flow rate limit is less than the flow rate.

The method 180 may include starting a process at step 218 to determine a clutch volume. In step 220, the clutch fill control module 142 computes a clutch fill time command. The clutch fill time command may be determined based on the clutch volume determined in step 218 and the clutch fill rate determined in step 216. In step 222, the clutch fill control module 142 performs clutch fill control based on the clutch fill pressure command and the clutch fill time command.

Figure 5A:
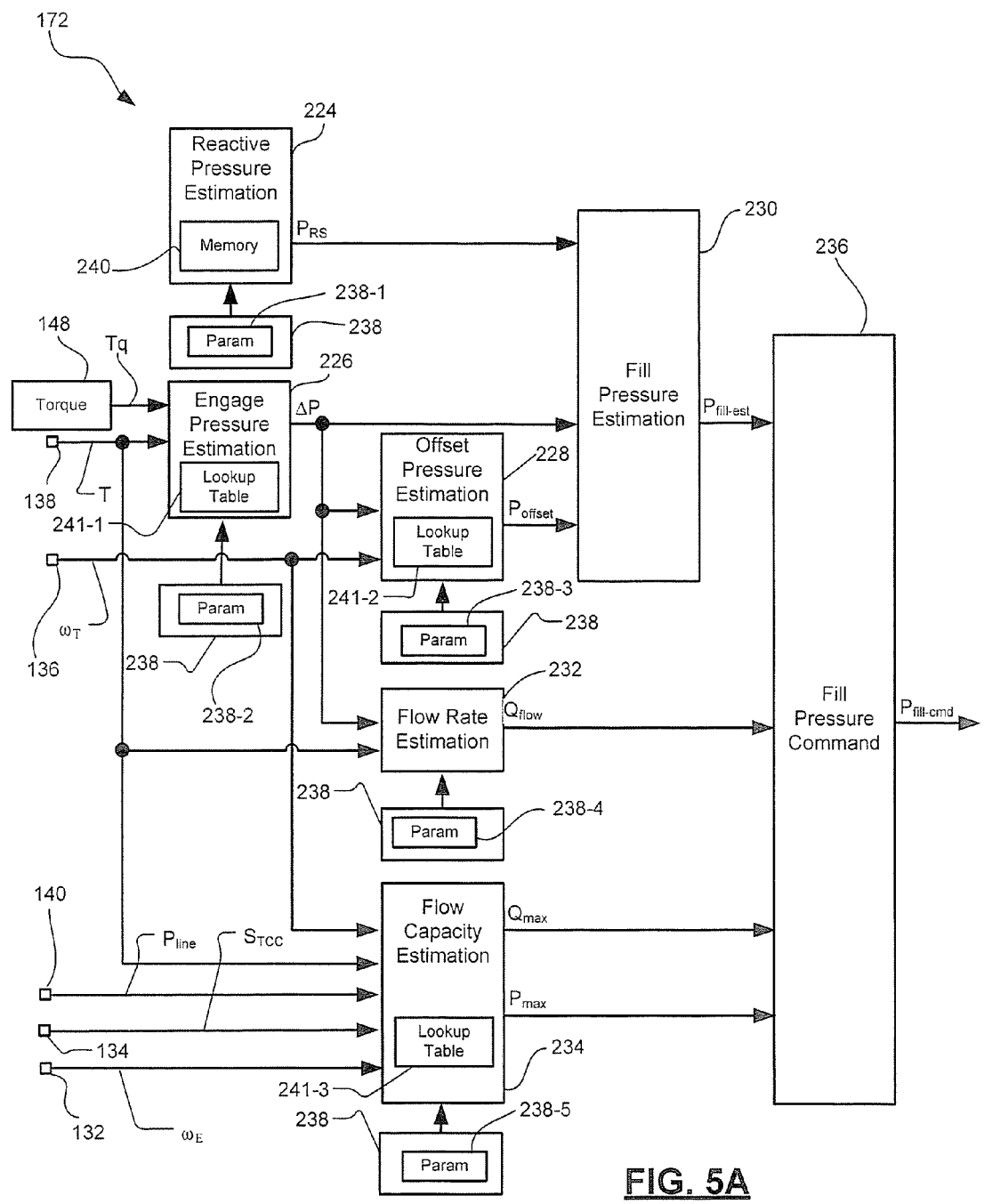
FIG. 5A is a functional block diagram of a pressure control module illustrating a first flow rate estimation according to the principles of the present disclosure.

Referring now also to FIG. 5A, a functional block diagram of the pressure control module 172 is shown. The pressure control module 172 generates the fill pressure command signal $P_{fill-cmd}$ based on a transmission torque signal Tq, the temperature signal T, the turbine speed signal $\omega_T$, the line pressure signal $P_{line}$, the clutch state signal $S_{TCC}$ and the engines speed signal $\omega_E$. The transmission torque signal Tq may be generated by the transmission torque module 148. The pressure control module 172 may include a reactive pressure estimation module 224, an engage pressure estimation module 226, an offset pressure estimation module 228, a fill pressure estimation module 230, a flow rate estimation module 232, a flow capacity estimation module 234 and a fill pressure command module 236.

The reactive pressure estimation module 224 determines a reactive pressure and generates a reactive pressure signal $P_{RS}$. The reactive pressure may be caused by a pretension of the return spring 162 of the clutch 152. The reactive pressure signal $P_{RS}$ may be generated based on calibration parameters 238-1 of the clutch 152 stored in memory 238. Memory 238 may also include calibration parameters of other clutches of the transmission 102. Memory 238 may also include calibration parameters of a clutch that is of different type from the clutch 152. The reactive pressure may be determined using table lookup based on the calibration parameters. The reactive pressure may also be determined using adaptive estimation. A value of the reactive pressure may be stored in memory 240.

The engage pressure estimation module 226 determines an engage pressure to fill the clutch chamber 160 and generates an engage pressure signal ΔP. The engage pressure signal ΔP may be generated based on the transmission torque signal Tq and the temperature signal T of transmission fluid in the hydraulic supply system 108. The engage pressure may be determined using a look-up table 241-1. The transmission torque signal Tq and the temperature signal T may be used as indexes for table lookup. Engage pressure values may be included in the calibration parameters 238-2 of the clutch 152 stored in memory 238.

The transmission torque signal Tq may indicate an amount of torque input to the transmission 102 at the input shaft 128. The transmission torque signal Tq may also indicate an amount of torque generated by the engine 112. The amount of torque input to the transmission 102 is the same as that provided by the engine 112 when the TCC is in a LOCKED state. The amount of torque input to the transmission 102 is amplified by a torque amplification factor from the amount of torque generated by the engine 112 when the TCC state is OPEN. The torque amplification factor may be determined based on the engine speed signal $\omega_E$ and the turbine speed signal $\omega_T$.

The offset pressure estimation module 228 determines an offset pressure in the clutch chamber 160 and generates an offset pressure signal $P_{offset}$. The same commanded pressure can result in different actual pressures in the clutch 152 due to rotational speeds of the clutch 152. The offset pressure signal $P_{offset}$ may be generated to compensate for this difference. As such, a cause for the offset pressure signal $P_{offset}$ is a change in a control system commanded pressure. The offset pressure signal $P_{offset}$ may be generated based on the engage pressure signal ΔP and a rotational speed of the clutch 152. The rotational speed of the clutch 152 may be determined based on the turbine speed $\omega_T$. The offset pressure signal $P_{offset}$ may be generated using a look-up table 241-2. The engage pressure signal ΔP and the turbine speed signal $\omega_T$ may be used as indexes for table lookup. Values of the offset pressure may be provided by calibration parameters 238-3 of the clutch 152 stored in memory 238.

The fill pressure estimation module 230 estimates a clutch fill pressure and generates a pressure estimate signal $P_{fill-est}$ that is representative of the clutch fill pressure. The fill pressure estimation module 230 may generate the pressure estimate signal $P_{fill-est}$ based on the engage pressure signal ΔP, the reactive pressure signal $P_{RS}$ and the offset pressure signal $P_{offset}$. The pressure estimate signal $P_{fill-est}$ indicates a pressure to be supplied to the clutch 152 during the clutch filling event.

The flow rate estimation module 232 estimates a flow rate for filling the clutch 152 and generates a flow rate signal $Q_{flow}$ based on the engage pressure signal ΔP and the temperature signal T. The flow rate signal $Q_{flow}$ may be generated using a flow rate equation. Calibration parameters for the flow equation may be provided by parameters 238-4 stored in memory 238. The calibration parameters may include orifice size, transmission fluid density, and discharge coefficient of the clutch system 168.

The flow capacity estimation module 234 estimates a flow capacity of the hydraulic supply system 108 that may be needed to perform the clutch filling. The flow capacity may be characterized by a flow rate limit and a pressure limit. The flow rate limit represents a maximum flow that the hydraulic supply system 108 may provide in performing the clutch filling. The pressure limit represents a maximum pressure available for clutch filling when the flow rate is equal to or greater than the flow rate limit.

The flow capacity estimation module 234 may generate a flow rate limit signal $Q_{max}$ and a pressure limit signal $P_{max}$ based on the turbine speed signal on $\omega_T$ the temperature signal T, the line pressure signal $P_{line}$, the clutch state signal $S_{TCC}$, and the engine speed signal $\omega_E$. The flow rate limit signal $Q_{max}$ and the pressure limit signal $P_{max}$ may be generated using a look-up table 241-3. The turbine speed signal $\omega_T$, temperature signal T, line pressure signal $P_{line}$, clutch state signal $S_{TCC}$, and engine speed signal $\omega_E$ may be used as indexes for table lookup. Values of the flow rate limit signal $Q_{max}$ and the pressure limit signal $P_{max}$ may be provided by calibration parameters 238-5 of the clutch 152 stored in memory 238.

The fill pressure command module 236 generates a fill pressure command signal $P_{fill-cmd}$ based on the pressure estimate signal $P_{fill-est}$, the flow rate signal $Q_{flow}$, the flow rate limit signal $Q_{max}$, and the pressure limit signal $P_{max}$. The fill pressure command signal $P_{fill-cmd}$ represents a pressure command for the valve control module 144 to perform pressure regulation at the control valve 114. The control valve 114 is operated at a REGULATION state to perform pressure regulation when the pressure estimate signal $P_{fill-est}$ indicates a value lower than the pressure limit signal $P_{max}$. In one embodiment, the fill pressure command signal $P_{fill-cmd}$ may be replaced by a valve command that operates the control valve 114 at an OPEN state when the pressure estimate signal $P_{fill-est}$ indicates a value greater than the pressure limit signal $P_{max}$.

Figure 5B:
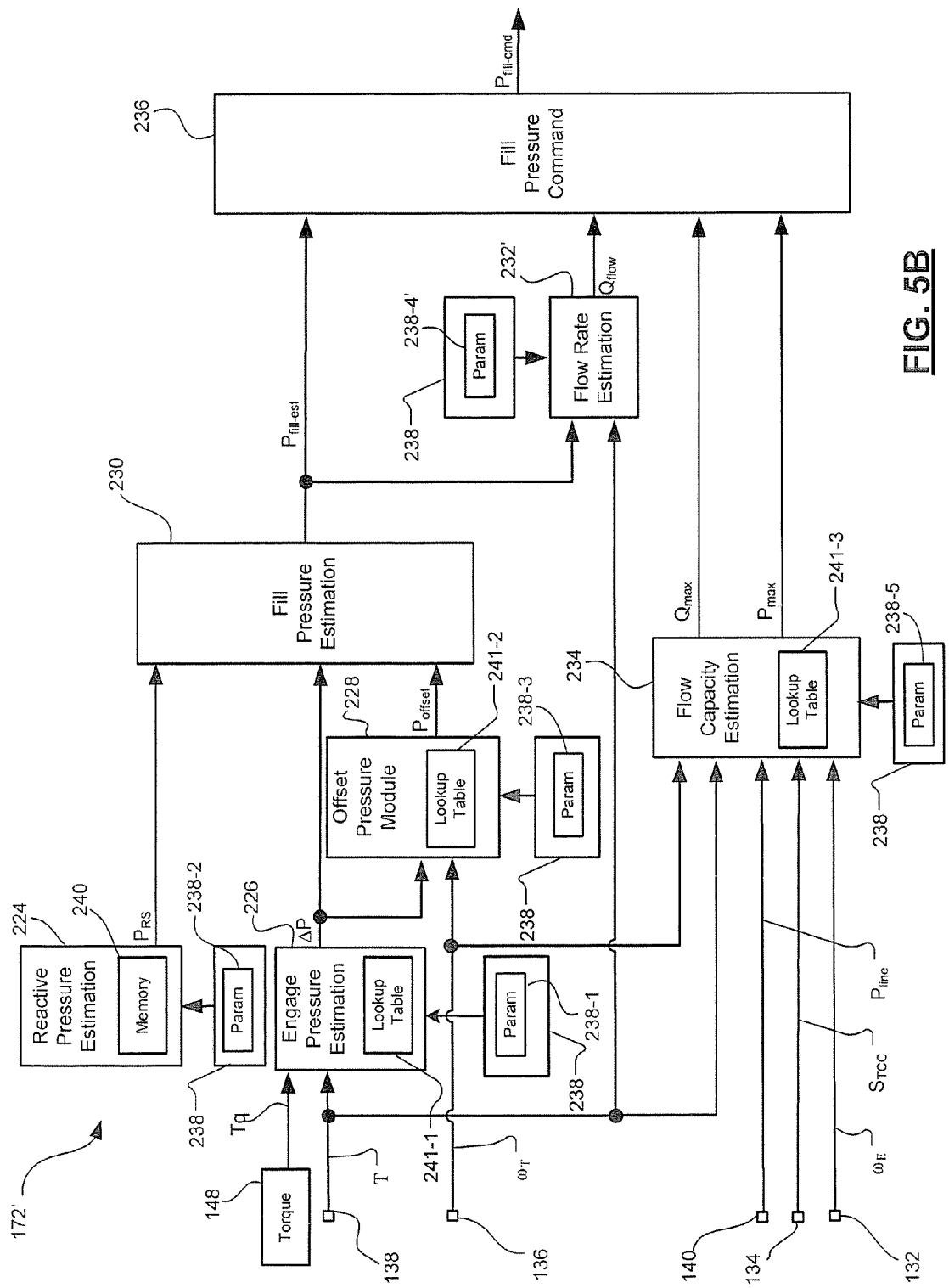
FIG. 5B is a functional block diagram of a pressure control module illustrating a second flow rate estimation according to the principles of the present disclosure.

Referring now also FIG. 5B, another example of a pressure control module 172' illustrated in FIG. 1 is shown. The pressure control module 172' generates the fill pressure command signal $P_{fill-cmd}$ based on the transmission torque signal Tq, the temperature signal T, the turbine speed signal $\omega_T$, the line pressure signal $P_{line}$, the clutch state signal $S_{TCC}$ and the engines speed signal $\omega_E$.

The pressure control module 172' includes a flow rate estimation module 232'. The pressure control module 172' may also include the reactive pressure estimation module 224, the engage pressure estimation module 226, the offset pressure estimation module 228, the fill pressure estimation module 230, the flow capacity estimation module 234 and the fill pressure command module 236 of FIG. 5A. The reactive pressure estimation module 224, engage pressure estimation module 226, offset pressure estimation module 228, fill pressure estimation module 230, flow capacity estimation module 234 and fill pressure command module 236 of the pressure control module 172' perform functions similar to corresponding modules in the pressure control module 172 of FIG. 5A.

The flow rate estimation module 232' generates the flow rate signal $Q_{flow}$ based on the pressure estimate signal $P_{fill-est}$ and the temperature signal T of transmission fluid. The flow rate signal $Q_{flow}$ may be generated using a flow rate equation. Calibration parameters for the flow equation may be provided by parameters 238-4' of a second clutch system stored in memory 238. The second clutch system may be different from the clutch system 168 of FIGS. 2A, 2B and 3. The calibration parameters may include orifice size, transmission fluid density, and discharge coefficient of the second clutch system.

Figure 6:
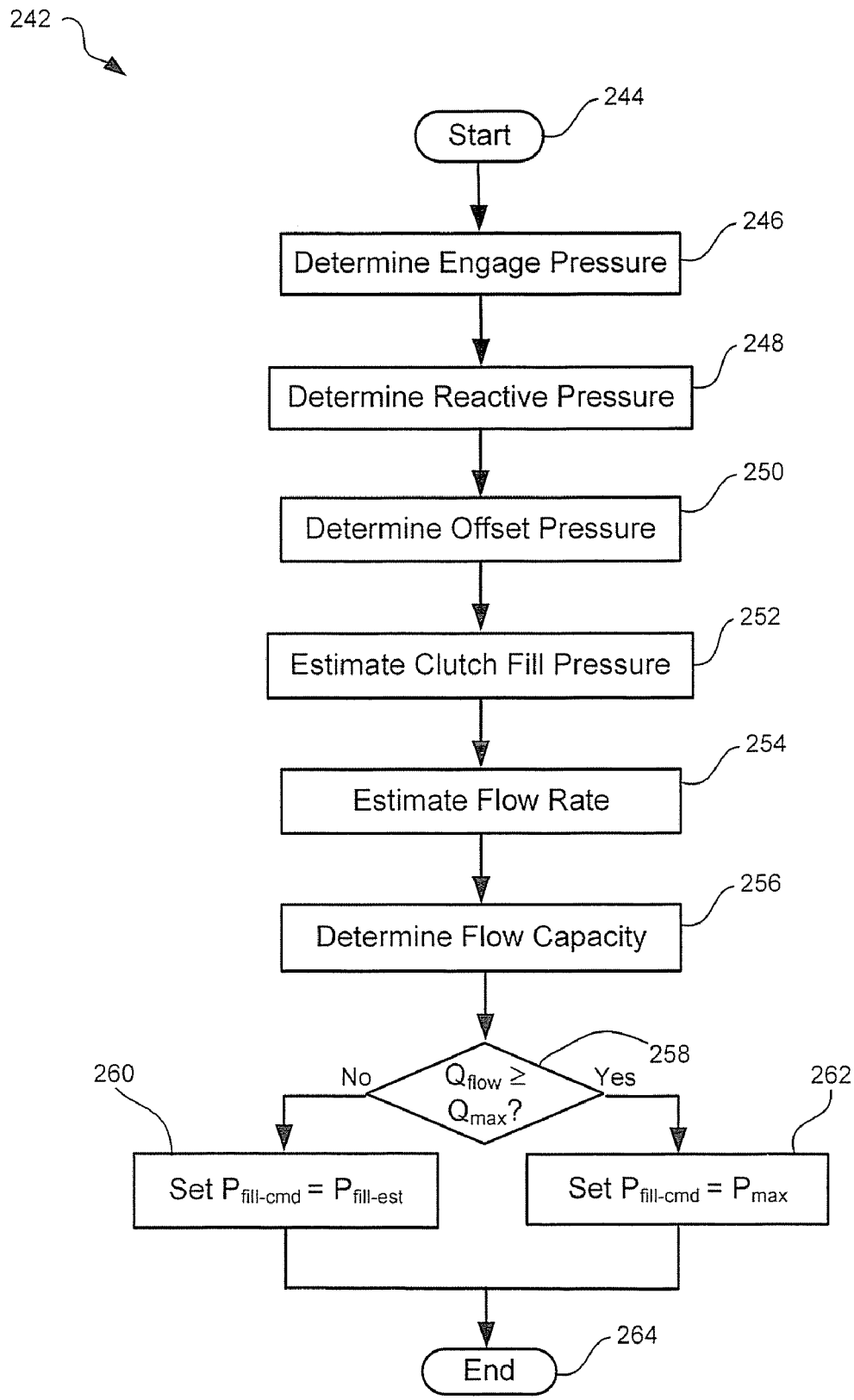
FIG. 6 illustrates a method of generating a fill pressure command signal according to the principles of the present disclosure.

Referring now also to FIG. 6, a method 242 of filling a clutch chamber 160 is illustrated. Control of the pressure control module 172 may execute steps associated with the method 242. Although the method 242 is primarily described with respect to FIGS. 1-5A, the method 242 may also be applied to other embodiments of the present disclosure. The method 242 may start at step 244.

In step 246, the pressure control module 172 determines an engage pressure and generates an engage pressure signal ΔP.

The engage pressure signal ΔP may be generated based on the transmission torque signal Tq and the temperature signal T of transmission fluid in the hydraulic supply system 108. A look-up table may be implemented in the engage pressure estimation module 226 to store calibration parameters for determining the engage pressure. The look-up table may use the transmission torque signal Tq and the temperature signal T as indices to perform table lookup. Values of the calibration parameters of the engage pressure may be determined using experiments conducted in a transmission control test bench.

In step 248, the pressure control module 172 estimates a reactive pressure and generates a reactive pressure signal $P_{RS}$. The reactive pressure may be caused by a return spring 162 of the clutch 152. The reactive pressure may be determined using calibration parameters stored in a look-up table that includes values of the reactive pressure.

In step 250, the pressure control module 172 determines an offset pressure and generates an offset pressure signal P offset. The pressure control module 172 may use a look-up table to determine the offset pressure based on calibration parameters of the clutch 152. The look-up table may be implemented based on the engage pressure and an input shaft speed of the transmission. The input shaft speed may be determined based on the turbine speed signal $\omega_T$. The engage pressure signal ΔP and the turbine speed signal $\omega_T$ may be used as indices to perform table lookup.

In step 252, the pressure control module 172 estimates a clutch fill pressure and generates a pressure estimate signal $P_{fill-est}$ that is representative of the clutch fill pressure. The pressure control module 172 may generate the pressure estimate signal $P_{fill-est}$ based on the engage pressure signal ΔP, the reactive pressure signal $P_{RS}$ and the offset pressure signal $P_{offset}$. For example, equation 1 may be used.

$$P_{fill-est} = \Delta P + P_{RS} + P_{offset} \quad (1)$$

In step 254, the pressure control module 172 determines a flow rate that may be requested to fill the clutch chamber 160 and generates a flow rate signal $Q_{flow}$. The flow rate signal $Q_{flow}$ may be generated using a flow equation based on a pressure variable $\Delta P_\phi$. For example, equation 2 may be used.

$$Q_{flow} = C_d A_\phi \sqrt{\frac{2}{\rho} \Delta P_\phi} \quad (2)$$

Parameter ρ represents a density of the transmission fluid, $C_d$ represents a discharge coefficient of the orifice and $A_\phi$ represents an orifice size of the orifice 164. In one embodiment, the pressure variable $\Delta P_\phi$ in equation 2 is a pressure difference $P_{orifice}$ across the orifice 164 in FIGS. 2A, 2B and 3 when the orifice 164 is downstream from the control valve 114, i.e., $\Delta P_\phi = P_{orifice}$. The value of the pressure $P_{orifice}$ across the orifice 164 may be determined based on the engage pressure signal ΔP. For example, equation 3 may be used.

$$P_{orifice} = \Delta P \quad (3)$$

Therefore, the pressure variable $\Delta P_\phi$ may be determined. For example, equation 4 may be used.

$$\Delta P_\phi = \Delta P \quad (4)$$

The flow rate estimation module 232 may perform step 254. The flow rate estimation module 232 may generate the flow rate signal $Q_{flow}$. For example, equation 5 may be used.

$$Q_{flow} = C_d A_\phi \sqrt{\frac{2}{\rho} \Delta P} \quad (5)$$

In another embodiment, the flow rate $Q_{flow}$ may be generated based on the pressure estimate signal $P_{fill-est}$. For example, the flow rate estimation module 232' of the pressure control module 172' in FIG. 5B may generate the flow rate signal $Q_{flow}$ based on the pressure estimate signal $P_{fill-est}$ and the temperature signal T of transmission fluid. The flow rate estimation module 232' may determine a pressure variable $\Delta P_\phi$ based on the pressure estimate signal $P_{fill-est}$. For example, equation 6 may be used.

$$\Delta P_\phi = P_{fill-est} \quad (6)$$

The flow rate estimation module 232' may generate the flow rate signal $Q_{flow}$. For example, equation 7 may be used.

$$Q_{flow} = C_d A_\phi \sqrt{\frac{2}{\rho} P_{fill-est}} \quad (7)$$

Figure 7:
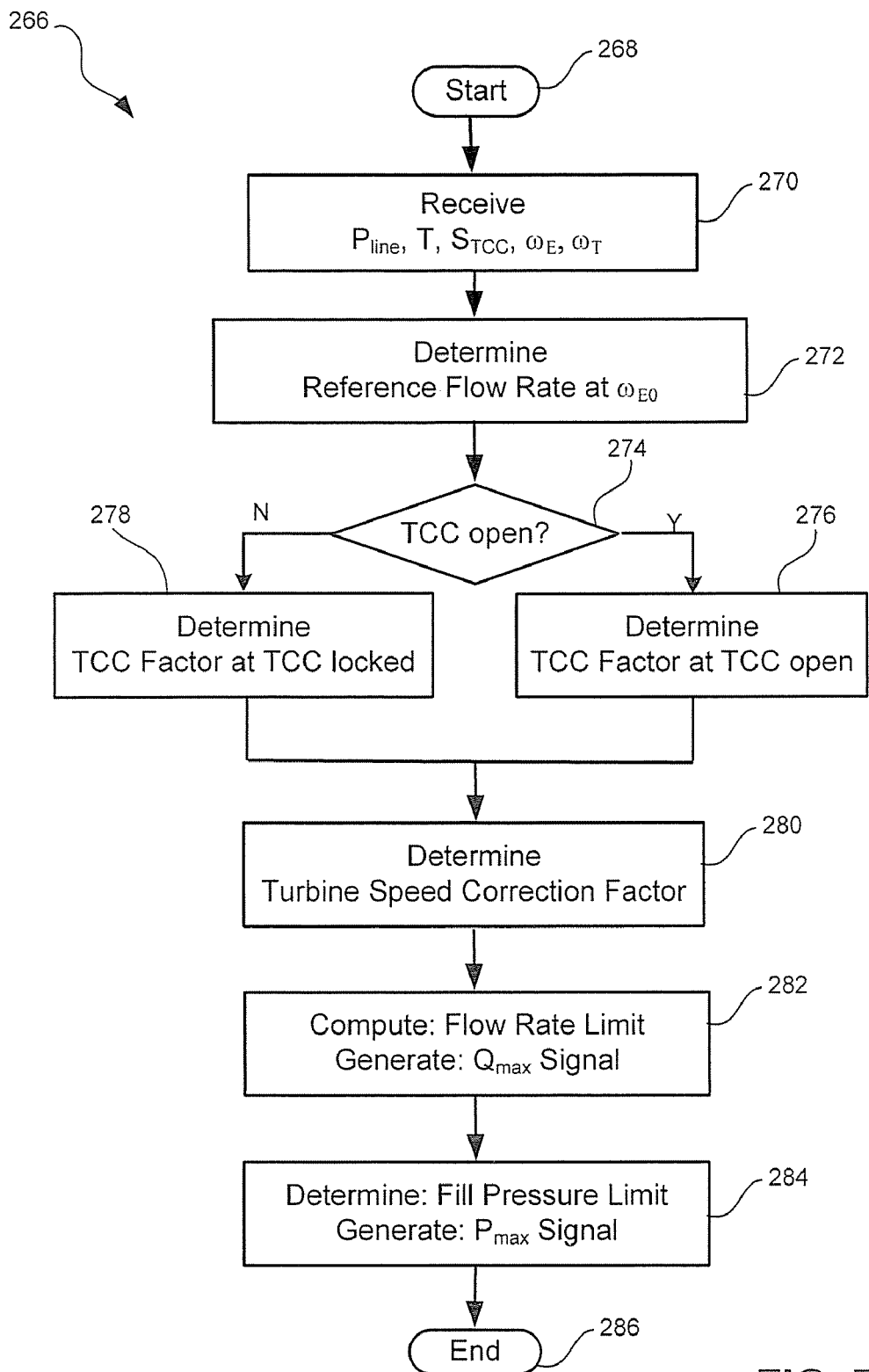
FIG. 7 illustrates a method of determining a flow capacity according to the principles of the present disclosure.

In step 256, the pressure control module 172 determines the flow capacity and generates the flow rate limit signal $Q_{max}$ and the pressure limit signal $P_{max}$. The pressure control module 172 may use look-up tables to generate the flow rate limit signal $Q_{max}$ and the pressure limit signal $P_{max}$ based on the engine speed signal $\omega_E$, the clutch state signal $S_{TCC}$, the turbine speed signal $\omega_T$, the temperature signal T and the line pressure signal $P_{line}$. An exemplary method for determining the flow capacity and generating the flow rate limit signal $Q_{max}$ and the pressure limit signal $P_{max}$ is illustrated in FIG. 7.

In step 258, the pressure control module 172 compares the flow rate signal $Q_{flow}$ with the flow rate limit signal $Q_{max}$. Control proceeds to step 260 when the flow rate signal $Q_{flow}$ indicates a lower value than the flow rate limit signal $Q_{max}$. Control proceeds to step 262 when the flow rate signal $Q_{flow}$ indicates a higher value than the flow rate limit signal $Q_{max}$.

In step 260, the fill pressure command module 236 may generate the fill pressure command signal $P_{fill-cmd}$ based on the pressure estimate signal $P_{fill-est}$. For example, equation 8 may be used.

$$P_{fill-cmd} = P_{fill-est} \quad (8)$$

The control valve 114 may be regulated to generate a hydraulic pressure according to a pressure level indicated by the pressure estimation signal $P_{fill-est}$. Control proceeds to end at step 264 after step 260.

In step 262, the fill pressure command module 236 may generate the fill pressure command signal $P_{fill-cmd}$ based on the pressure limit signal $P_{max}$. For example, equation 9 may be used.

$$P_{fill-cmd} = P_{max} \quad (9)$$

The control valve 114 may be regulated to generate a hydraulic pressure according to a pressure level indicated by the pressure limit signal $P_{max}$. Control proceeds to end at step 264 after step 262.

In one embodiment, when the estimated flow rate is greater than the flow rate limit, a valve command that provides a maximum transmission fluid flow available may be used to fill the clutch chamber 160. The valve command may operate the control valve 114 in an OPEN state. The control valve 114 may be opened to a maximum extent, and a maximum amount of transmission fluid may flow through the control valve 114 when the control valve 114 is operated in an OPEN state. Pressure regulation is not performed when the control valve 114 is operated in an OPEN state.

FIG. 7 illustrates an exemplary method 266 of determining flow capacity of the clutch system 106. Control of the flow capacity estimation module 234 may execute steps associated with the method 266. The method 266 may start at step 268.

In step 270, the flow capacity estimation module 234 receives signals for determining the flow capacity. The signals may include the line pressure signal $P_{line}$, the temperature signal T of transmission fluid, the clutch state signal $S_{TCC}$ of the torque converter, the engine speed signal $\omega_E$ and the turbine speed signal $\omega_T$.

In step 272, the flow capacity estimation module 234 determines a reference flow rate limit $Q_{limit0}$. The reference flow rate $Q_{limit0}$ may be a flow rate of the clutch system 106 evaluated at a reference engine speed $\omega_{E0}$ on a transmission test bench. The reference flow rate $Q_{limit0}$ may be determined based on the line pressure signal $P_{line}$ and the temperature signal T according to a function. For example, equation 10 may be used.

$$Q_{limit0} = f1(P_{line}, T) \quad (10)$$

The reference flow rate limit $Q_{limit0}$ may be determined using table lookup. The line pressure signal $P_{line}$ and the temperature signal T may be used as indexes for the table lookup.

In step 274, control proceeds to step 276 when the clutch state signal $S_{TCC}$ indicates an OPEN state. Control proceeds to step 278 when the clutch state signal $S_{TCC}$ indicates a LOCKED state.

In step 276, a TCC factor $Q_{TCC}$ of hydraulic flow is determined based on the line pressure signal $P_{line}$, the temperature signal T and an OPEN state of the TCC 130. The TCC factor $Q_{TCC}$ may be determined according to a function. For example, equation 11 may be used.

$$Q_{TCC} = f2(P_{line}, T, S_{TCC}) \quad (11)$$

$S_{TCC}$ is OPEN in applying equation 10 in step 276. The TCC factor $Q_{TCC}$ may be determined using table lookup. The line pressure signal $P_{line}$, temperature signal T and clutch state signal $S_{TCC}$ may be used as indexes for the table lookup.

In step 278, the TCC factor $Q_{TCC}$ is determined based on the line pressure signal $P_{line}$, the temperature signal T and a LOCKED state of the TCC 130. The TOG factor $Q_{TCC}$ may be determined using equation 10 where $S_{TCC}$ is set at a value of LOCKED. The TCC factor $Q_{TCC}$ may be determined using table lookup. The line pressure signal $P_{line}$, temperature signal T and clutch state signal $S_{TCC}$ may be used as indexes for the table lookup.

In step 280, a turbine speed correction factor $Q_{turbine}$ is determined based on the temperature signal T, the engine speed signal $\omega_E$ and the turbine speed signal $\omega_T$. The turbine speed correction factor $Q_{turbine}$ may be determined according to a function. For example, equation 12 may be used.

$$Q_{turbine} = f3(\omega_E, \omega_T, T) \quad (12)$$

The turbine speed correction factor $Q_{turbine}$ may be determined using table lookup. The temperature signal T, the engine speed signal $\omega_E$ and the turbine speed signal $\omega_T$ may be used as indexes for the table lookup.

In step 282, the flow rate limit signal $Q_{max}$ may be generated based on the reference flow rate limit $Q_{limit0}$, the TCC factor $Q_{TCC}$ and the turbine speed correction factor $Q_{turbine}$. For example, equation 13 may be used.

$$Q_{max} = Q_{limit0} - Q_{TCC} + Q_{turbine} \quad (13)$$

In step 284, the flow capacity estimation module 234 generates the pressure limit signal $P_{max}$. When the estimated flow rate exceeds the flow rate limit, the hydraulic supply system 108 may not be able to provide the estimated fill pressure as requested. A secondary fill pressure may be commanded in lieu of the clutch fill pressure estimated in step 252. The fill pressure limit signal $P_{max}$ may be generated to determine at a level of the secondary fill pressure. The pressure limit signal $P_{max}$ may be generated based on the flow rate limit signal $Q_{max}$ and the temperature signal T according to a function. For example, equation 14 may be used.

$$P_{max} = f4(Q_{max}, T) \quad (14)$$

The pressure limit signal $P_{max}$ may be generated using table lookup. The flow rate limit signal $Q_{max}$ and the temperature signal T may be used as indexes for the table lookup. The method 266 may end at step 286 after step 284.

Figure 8:
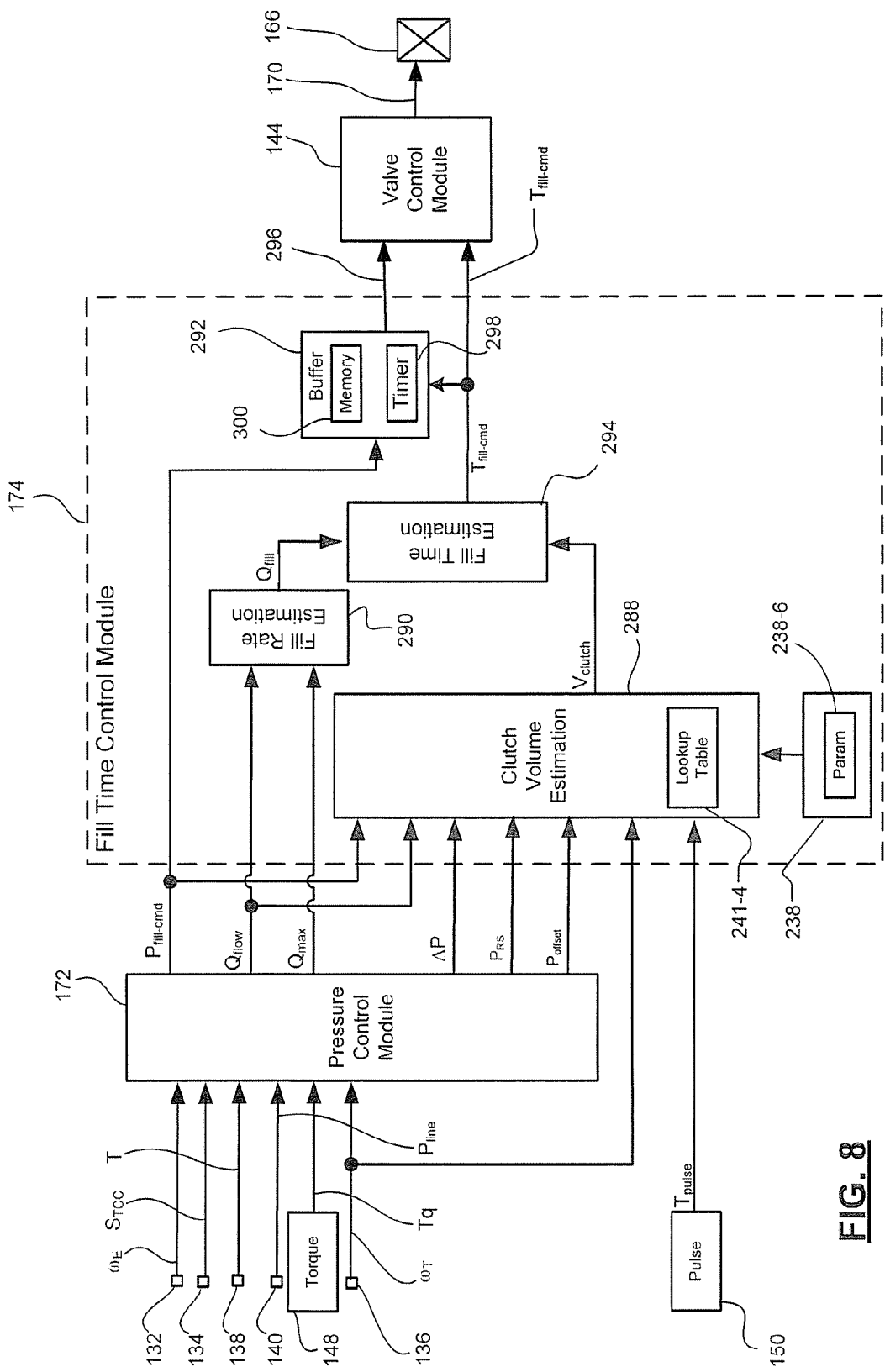
FIG. 8 is a functional block diagram of a fill time control module according to the principles of the present disclosure.

Referring now also to FIG. 8, a functional block diagram of an exemplary time control module 174 is shown. The fill time control module 174 determines a fill time for applying hydraulic pressure to the clutch chamber 160 and generates a fill time command signal $T_{fill-cmd}$. The fill time control module 174 may include a clutch volume estimation module 288, a fill rate estimation module 290, a buffer module 292 and a fill time estimation module 294.

The fill time control module 174 generates the fill time command signal $T_{fill-cmd}$ and a buffered fill pressure command signal 296 based on the turbine speed signal $\omega_T$, a clutch pulse signal $T_{pulse}$ and signals from the pressure control module 172. The clutch pulse signal $T_{pulse}$ may be generated by the clutch pulse module 150. The signals from the pressure control module 172 may include the fill pressure command signal $P_{fill-cmd}$, the flow rate signal $Q_{flow}$, the flow rate limit signal $Q_{max}$, the engage pressure signal $\Delta P$, the reaction pressure signal $P_{RS}$, and the offset pressure signal $P_{offset}$. The valve control module 144 may generate the valve control signal 170 based on the fill time command signal $T_{fill-cmd}$ and the buffered fill pressure command signal 296. The solenoid 166 may be operated based on the valve command signal 170.

The clutch volume estimation module 288 determines a volume of the clutch chamber 160 and generates a clutch volume signal $V_{clutch}$. The clutch volume estimation module 288 may generate the clutch volume signal $V_{clutch}$ based the fill pressure command signal $P_{fill-cmd}$, the flow rate signal $Q_{flow}$, the flow rate limit signal $Q_{max}$, the engage pressure signal $\Delta P$, the reactive pressure signal $P_{RS}$, the offset pressure signal $P_{offset}$, the turbine speed signal $\omega_T$, and the clutch pulse signal $T_{pulse}$. The clutch volume signal $V_{clutch}$ may be generated using a look-up table 241-4. Calibration parameters 238-6 of the clutch 152 stored in memory 238 may be used to generate the clutch volume signal $V_{clutch}$. The fill pressure command signal $P_{fill-cmd}$, the flow rate signal $Q_{flow}$, the flow rate limit signal $Q_{max}$, the engage pressure signal $\Delta P$, the reactive pressure signal $P_{RS}$, the offset pressure signal P offset, the turbine speed signal $\omega_T$ and the clutch pulse signal $T_{pulse}$ may be used as indexes for table lookup.

The fill rate estimation module 290 determines a clutch fill rate and generates a fill rate signal $Q_{fill}$. The fill rate estimation module 290 generates a fill rate signal $Q_{fill}$ based on the flow rate signal $Q_{flow}$ and the flow rate limit signal $Q_{max}$. The fill rate signal $Q_{fill}$ may be generated according to a method illustrated in FIG. 9.

The fill time estimation module 294 generates a fill time command signal $T_{fill-cmd}$ based on the fill rate signal $Q_{fill}$ and the clutch volume signal $V_{clutch}$. The fill time command signal $T_{fill-cmd}$ may be generated according a method illustrated in FIG. 9.

The buffer module 292 may store the fill time command signal $T_{fill-cmd}$ in a timer 298. The buffer module 292 may also include memory 300 to store the fill pressure command signal $P_{fill-cmd}$. The memory 300 may be used to hold a value of the fill pressure command signal $P_{fill-cmd}$ for a duration indicated by the fill time command signal $T_{fill-cmd}$. The buffer module 292 may generate the buffered fill pressure command signal 296 based on the fill pressure command signal $P_{fill-cmd}$ and the fill time command signal $T_{fill-cmd}$.

Figure 9:
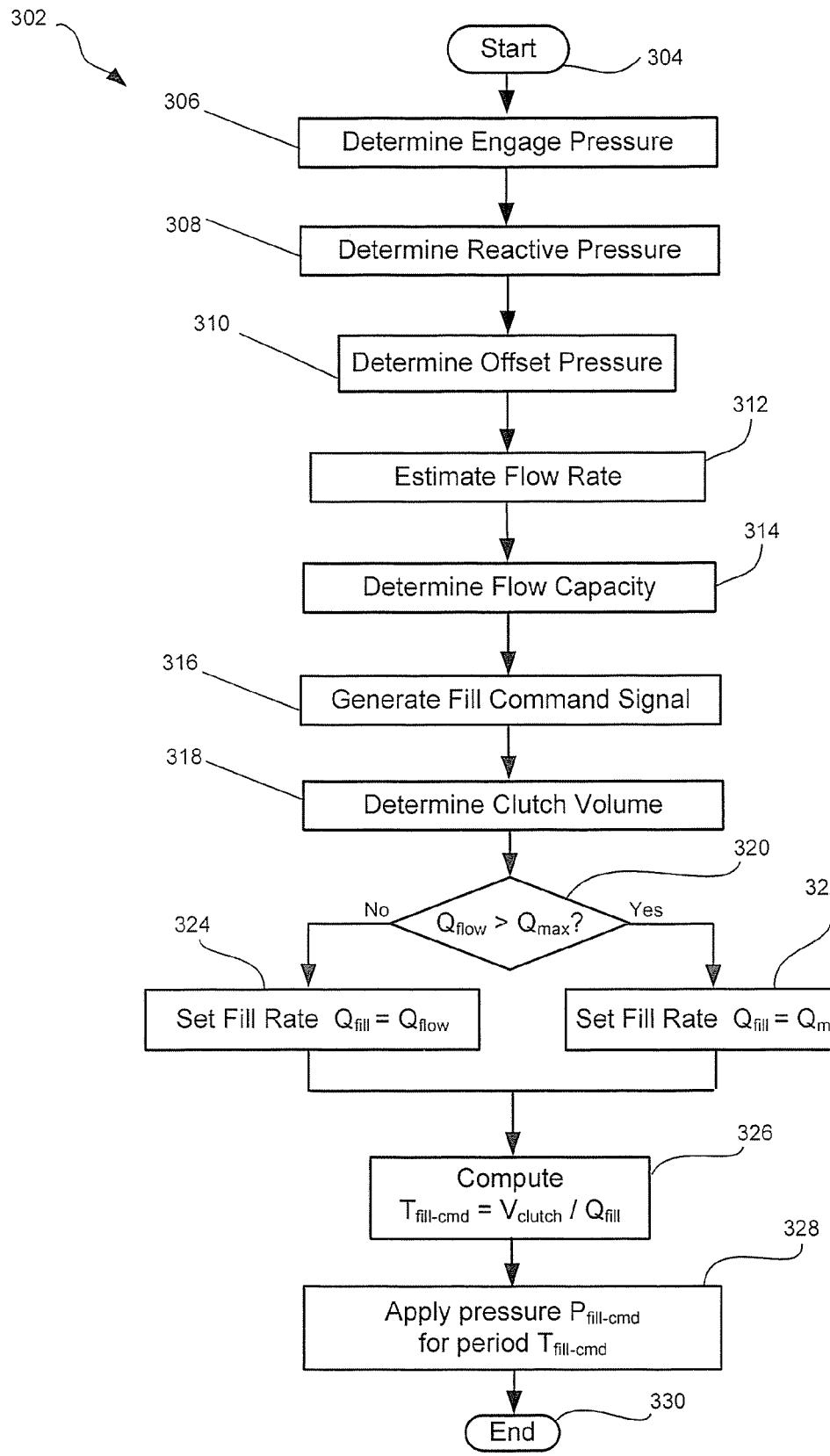
FIG. 9 illustrates a method of generating a fill time command signal according to the principles of the present disclosure.

Referring now also to FIG. 9, a method 302 of filling the clutch 152 is shown. Control of the pressure control module 172 and the fill time control module 174 may execute steps associated with the method 302. Although the method 302 is primarily described with respect to FIG. 8, the method 302 may also be applied to other embodiments of the present disclosure. The method 302 may start at step 304.

In step 306, the pressure control module 172 determines the engage pressure and generates an engage pressure signal ΔP. The engage pressure signal may be generated using a similar method as in step 246 of FIG. 6.

In step 308, the pressure control module 172 determines a reactive pressure and generates a reactive pressure signal $P_{RS}$. The reactive pressure signal $P_{RS}$ may be generated using a similar method as in step 248 of FIG. 6.

In step 310, the pressure control module 172 determines an offset pressure and generates an offset pressure signal P offset. The offset pressure signal $P_{offset}$ may be generated using a similar method as in step 250 of FIG. 6.

In step 312, the pressure control module 172 estimates a flow rate and generates a flow rate signal $Q_{flow}$. The flow rate signal $Q_{flow}$ may be generated using a similar method as in step 254 of FIG. 6.

In step 314, the pressure control module 172 determines q flow capacity and generates a flow rate limit signal $Q_{max}$ and a pressure limit signal $P_{max}$. The flow rate limit signal $Q_{max}$ and the pressure limit signal $P_{max}$ may be generated using a similar method as in step 256 of FIG. 6.

In step 316, the pressure control module 172 generates a fill pressure command signal $P_{fill-cmd}$. The fill pressure command signal $P_{fill-cmd}$ may be generated based on the engage pressure signal ΔP, the reactive pressure signal $P_{RS}$, the offset pressure signal P offset, the flow rate signal $Q_{flow}$, the flow rate limit signal $Q_{max}$, and the pressure limit signal $P_{max}$ using a similar method as in FIG. 6.

In step 318, the fill time control module 174 determines a clutch volume and generates a clutch volume signal $V_{clutch}$. The clutch volume signal $V_{clutch}$ may be generated using a look-up table. The clutch volume signal $V_{clutch}$ may be generated based on the flow rate signal $Q_{flow}$ and a clutch pulse signal $T_{pulse}$. For example, equation 15 may be used.

$$V_{clutch} = Q_{flow} * T_{pulse} \quad (15)$$

The clutch pulse signal $T_{pulse}$ may be determined from a clutch fill event that is before a current clutch fille vent.

In step 320, the fill time control module 174 compares the flow rate signal $Q_{flow}$ with the flow rate limit signal $Q_{max}$. Control proceeds to step 322 when the flow rate signal $Q_{flow}$ indicates a greater value than the flow rate limit signal $Q_{max}$. Otherwise control proceeds to step 324.

In step 322, the fill time control module 174 generates a fill rate signal $Q_{fill}$. The fill rate signal $Q_{fill}$ is generated to have a value of the flow rate limit signal $Q_{max}$.

In step 324, the fill time control module 174 generates a fill rate signal $Q_{fill}$. The fill rate signal $Q_{fill}$ is generated to have a value of the flow rate signal $Q_{flow}$.

In step 326, the fill time control module 174 determines a fill time for applying hydraulic pressure to the clutch 152 and generates a fill time command signal $T_{fill-cmd}$. The fill time command signal may be determined based on the clutch volume signal $V_{clutch}$ and the fill rate signal $Q_{fill}$. For example, equation 2 may be used.

$$T_{fill-cmd} = \frac{V_{clutch}}{Q_{fill}} \quad (16)$$

In step 328, the fill time control module 174 performs the clutch fill event. The fill time control module 174 applies hydraulic pressure based on the fill pressure command signal $P_{fill-cmd}$ for a period of time determined by the fill time command signal $T_{fill-cmd}$. The method 302 may end at step 330 after step 328.

Figure 10:
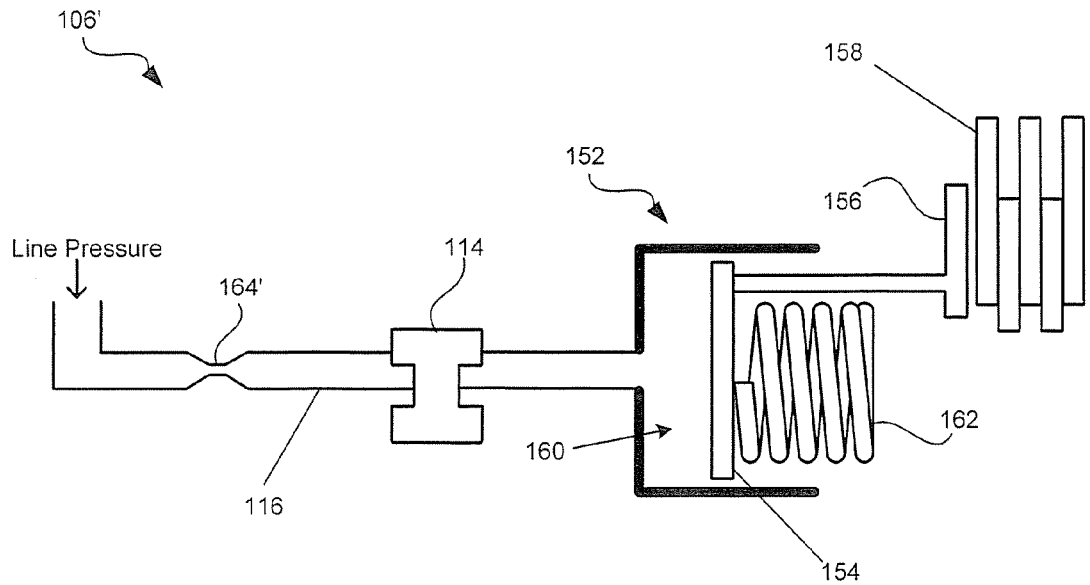
FIG. 10 is a schematic diagram of an exemplary clutch system of an automatic transmission.

The methods of filling a clutch chamber of an automatic transmission described above are not limited to the clutch system 106 FIGS. 2A and 2B. In FIGS. 2A and 2B, the orifice 164 of the clutch system 106 is located downstream from the control valve 114. FIG. 10 illustrates a second type of a clutch system 106' that is different from the clutch system 106. An orifice 164' is located upstream from the control valve 114 in the clutch system 106'. When applying the methods of present disclosure to the clutch system 106', different control parameters may replace one or more corresponding parameters provided by the parameter modules 238 in FIGS. 5A, 5B and 8. For example, in using equation 2 for flow rate estimation, the pressure variable $\Delta P_\phi$ may be substituted by a line pressure signal $P_{line}$.

Figure 11:
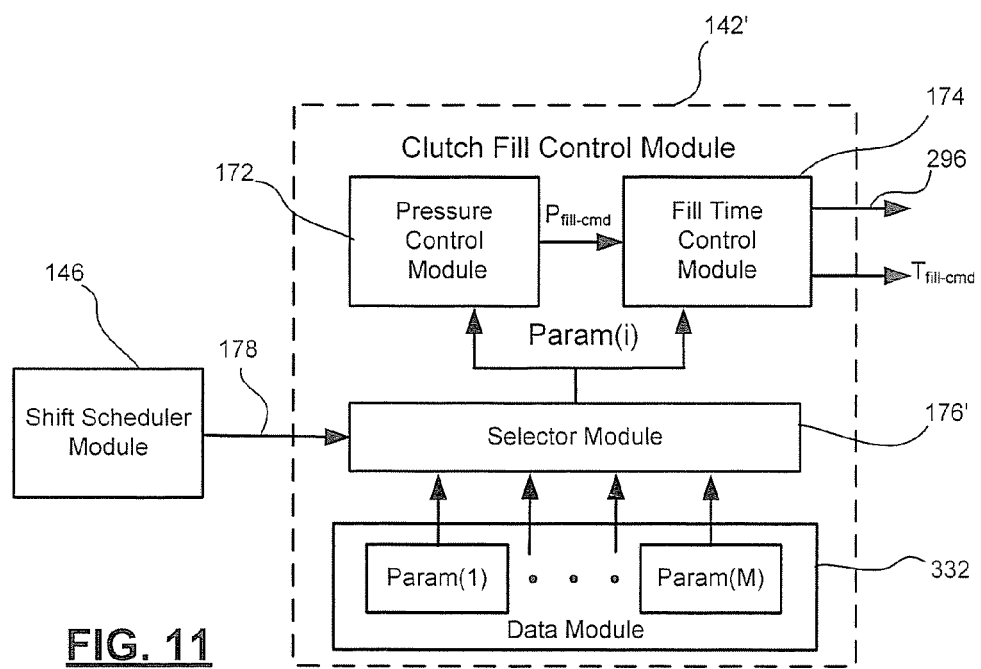
FIG. 11 is a functional block diagram of an adaptable clutch fill control module according to the principles of the present disclosure.

Referring now also to FIG. 11, a functional block diagram of a clutch fill control module 142' is illustrated. The clutch fill control module 142' may apply control methods of the present disclosure to different types of clutch control systems. The clutch control systems may have different configurations and orifice locations. The clutch fill control module 142' may include the selector module 176' and a data module 332.

The selector module 176' selects an i-th set of control parameters Param(i) from multiple sets of control parameters, Param(1), . . . , Param(M) stored in the data module 332. The selector module 176' selects the control parameters Param(i) based on the shift schedule signal 178. The shift schedule signal 178 may indicate that an on-coming clutch to be filled is of i-th type. The shift schedule signal 178 may be generated by the shift schedule module 146. Each one of the control parameter sets, Param(1), . . . , Param(M) may include calibration parameters for a corresponding type of clutch of the automatic transmission 102. The calibration parameters may include parameters 238-1, 238-2, 238-3, 238-4, 238-5 and 238-6. The pressure control module 172 and the fill time control module 174 may respectively generate the fill pressure command signal $P_{fill-cmd}$ and the fill time command signal $T_{fill-cmd}$ based on the calibration parameters included in the control parameter set Param(i).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of filling a clutch chamber of an automatic transmission comprising:
determining an engage pressure to engage a clutch of the automatic transmission;
determining a reactive pressure of a return spring of the clutch;
estimating a fill pressure for filling the clutch chamber based on the engage pressure and the reactive pressure;
estimating a flow rate based on the fill pressure; and
generating a fill pressure command signal to fill the clutch chamber based on the fill pressure, the flow rate and a flow rate limit.

2. The method of claim 1 further comprising estimating a centrifugal pressure of the clutch chamber based on the engage pressure and a rotational speed of the clutch.

3. The method of claim 2, wherein the fill pressure is estimated based on the centrifugal pressure.

4. The method of claim 1, wherein the flow rate limit is determined based on:
a line pressure signal of hydraulic pressure in a pressurized transmission fluid supply line;
a clutch state signal of a torque converter clutch; and
a temperature signal of transmission fluid inside the automatic transmission.

5. The method of claim 1, wherein the fill pressure command signal is equal to the fill pressure when the flow rate is less than the flow rate limit.

6. The method of claim 1, wherein the fill pressure command signal is equal to a pressure limit when the flow rate exceeds the flow rate limit.

7. The method of claim 1 further comprising opening a clutch control valve to a maximum open position when the flow rate exceeds the flow rate limit.

8. A method of filling a clutch chamber of an automatic transmission comprising:
estimating a fill pressure for filling the clutch chamber;
determining a volume of the clutch chamber;
estimating a flow rate to fill the clutch chamber;
determining a flow rate limit based on:
a line pressure signal of hydraulic pressure in a pressurized transmission fluid supply line;
a clutch state signal of a torque converter clutch; and
a temperature signal of transmission fluid inside the automatic transmission;
generating a fill time command signal based on the volume, the flow rate and the flow rate limit; and
applying the fill pressure for a period based on the fill time command signal.

9. The method of claim 8, wherein the fill pressure is estimated based on an engage pressure to engage the clutch and a reactive pressure of the clutch, and
wherein the reactive pressure is caused by a return spring of the clutch.

10. The method of claim 8, wherein the fill pressure is estimated based on a centrifugal pressure of the clutch chamber, and
wherein the centrifugal pressure is caused by a rotational motion of the clutch.

11. The method of claim 10, wherein the centrifugal pressure is determined based on an engage pressure and a rotational speed of the clutch.

12. The method of claim 8, wherein the generating of the fill time command signal comprises:
determining a fill rate of the clutch chamber based on a lower one of the flow rate and the flow rate limit; and
determining a fill time based on the volume and the fill rate.

13. The method of claim 8, wherein the estimating of the flow rate comprises:
determining an engage pressure to engage the clutch;
estimating a reactive pressure of the clutch, wherein the reactive pressure is caused by a return spring of the clutch;
estimating a centrifugal pressure of the clutch chamber, wherein the centrifugal pressure is caused by a rotational motion of the clutch; and
estimating the flow rate based on the engage pressure, the reactive pressure, the centrifugal pressure and a temperature signal of transmission fluid inside the automatic transmission.

14. A system for filling a clutch chamber of an automatic transmission comprising:
a pressure control module that:
determines an engage pressure to engage a clutch of the automatic transmission;
estimates a reactive pressure of a return spring of the clutch; and
generates a fill pressure command signal to fill the clutch chamber based on the engage pressure and the reactive pressure;
a clutch volume estimation module that determines a volume of the clutch chamber;
a fill rate estimation module that determines a fill rate based on a flow rate and a flow rate limit; and
a fill time estimation module that generates a fill time command signal based on the volume and the fill rate.

15. The system of claim 14 further comprising
a selector module that selects one of a plurality of parameter sets for the pressure control module and the fill time estimation module based on a shift scheduler signal of the automatic transmission,
wherein the shift scheduler signal indicates the clutch to be filled.

16. The system of claim 15 further comprising
a data module comprising the plurality of parameter sets,
wherein the selector module selects a parameter set from the data module.

17. The system of claim 14, wherein the pressure control module estimates a centrifugal pressure of the clutch chamber based on the engage pressure and a rotational speed of the clutch, and
wherein the pressure control module generates the fill pressure command signal based on the centrifugal pressure.

18. The system of claim 14, wherein the pressure control module:
estimates the flow rate based on the engage pressure;
determines the flow rate limit based on:
a line pressure signal of hydraulic pressure in a pressurized transmission fluid supply line;
a clutch state signal of a torque converter clutch; and
a temperature signal of transmission fluid inside the automatic transmission; and
generates the fill pressure command signal based on the flow rate and the flow rate limit.

19. The system of claim 18, wherein the pressure control module:
estimates a fill pressure; and
generates the fill pressure command signal equal to the fill pressure when the flow rate is less than the flow rate limit.

20. The system of claim 18, wherein the pressure control module opens a clutch control valve to a maximum open position when the flow rate exceeds the flow rate limit.

* * * * *